US008805888B2

(12) United States Patent
Desai et al.

(10) Patent No.: US 8,805,888 B2
(45) Date of Patent: Aug. 12, 2014

(54) SYSTEMS AND METHODS FOR MAINTAINING GROUP MEMBERSHIP RECORDS

(71) Applicant: Symantec Corporation, Mountain View, CA (US)

(72) Inventors: Hrishikesh Desai, Maharashtra (IN); Krishna Ghodke, Maharashtra (IN)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 13/779,723

(22) Filed: Feb. 27, 2013

(65) Prior Publication Data

US 2013/0226864 A1     Aug. 29, 2013

Related U.S. Application Data

(63) Continuation of application No. 13/407,748, filed on Feb. 28, 2012, now Pat. No. 8,429,197.

(51) Int. Cl.
*G06F 7/02* (2006.01)
*G06F 17/30* (2006.01)

(52) U.S. Cl.
USPC ............ 707/797; 707/778; 707/802; 707/956

(58) Field of Classification Search
None
See application file for complete search history.

(56) References Cited

U.S. PATENT DOCUMENTS

| 7,480,651 | B1 | 1/2009 | Matthiesen et al. |
| 7,769,752 | B1* | 8/2010 | Turner et al. ................. 707/731 |
| 2004/0117260 | A1 | 6/2004 | Yuasa et al. |
| 2004/0123234 | A1* | 6/2004 | Anderson et al. ............. 715/513 |
| 2011/0145237 | A1* | 6/2011 | Bai et al. ....................... 707/737 |

FOREIGN PATENT DOCUMENTS

| JP | 2005-182334 A | 7/2005 |
| JP | 2011-060096 A | 3/2011 |
| KR | 10-2005-0050986 A | 6/2005 |
| KR | 10-2005-0072868 A | 7/2005 |

OTHER PUBLICATIONS

Edward Kileen; Google Apps Active Directory sync; imanami—get-group Blog; Aug. 25, 2011; Imanami Corporation; http://blog.imanami.com/blog/bid/66002/Google-Apps-Active-Directory-sync, as accessed Jan. 24, 2012.
Symantec Corporation; Systems and Methods for Maintaining Group Membership Records; PCT/US13/27616; Filed Feb. 25, 2013.

* cited by examiner

*Primary Examiner* — Bruce Moser
(74) *Attorney, Agent, or Firm* — ALG Intellectual Property, LLC

(57) ABSTRACT

A method for maintaining group membership records includes 1) maintaining a record of group memberships for a membership hierarchy, the membership record identifying a direct relationship between a first object and a second object in the membership hierarchy, 2) receiving a membership update indicating that, as of a first point in time, a direct relationship between the second object and a third object changed, 3) updating the record of group memberships to reflect the change in the relationship between the second object and the third object, 4) deducing, based on the membership update and the record of group memberships, a change in an indirect relationship between the first object and the third object as of the first point in time, and 5) providing a view of object relationships within the membership hierarchy as the object relationships exist at the first point in time and a historical record of object relationships.

20 Claims, 7 Drawing Sheets

SYSTEMS AND METHODS FOR MAINTAINING GROUP MEMBERSHIP RECORDS

CROSS REFERENCE TO RELATED APPLICATION

This application is a continuation of U.S. application Ser. No. 13/407,748, filed 28 Feb. 2012, the disclosure of which is incorporated, in its entirety.

BACKGROUND

In a group membership hierarchy maintained by an enterprise, user and group membership relationships may frequently change. Directory services, such as Active Directory, may enable administrators to identify direct relationship changes within a group membership hierarchy. However, such services may not enable administrators to identify indirect relationship changes within group membership hierarchies and/or may not provide historical membership data. As a result, performing electronic discovery (and/or any other type of audit) of information within a group membership hierarchy may be time and resource intensive, particularly within large organizations. For example, an electronic discovery application may take weeks to traverse an Active Directory with thousands of users. To complicate matters, traditional electronic discovery solutions for membership hierarchies may be unreliable due to run-time errors. What is needed, therefore, is a more efficient and effective mechanism for identifying, tracking, and/or managing group information for membership hierarchies.

SUMMARY

As will be described in greater detail below, the instant disclosure generally relates to systems and methods for maintaining group membership records. In one example, a computer-implemented method for maintaining group membership records may include 1) maintaining a record of group memberships for a membership hierarchy, the membership record identifying a direct relationship between a first object and a second object in the membership hierarchy, 2) receiving a membership update indicating that, as of a first point in time, a direct relationship between the second object and a third object changed, 3) updating the record of group memberships to reflect the change in the relationship between the second object and the third object, 4) deducing, based on the membership update and the record of group memberships, a change in an indirect relationship between the first object and the third object as of the first point in time, 5) using the record of group memberships, the updated change in the direct relationship between the second and third objects, and the deduced change in the indirect relationship between the first and third objects to provide a view of object relationships within the membership hierarchy as they exist at the first point in time, and 6) maintaining a historical record of group memberships as they existed before the first point in time.

In at least one embodiment, the method may further include creating the historical record such that the historical record indicates the second and third objects were directly related before the first point in time and the first and third objects were indirectly related before the first point in time. Additionally or alternatively, the membership hierarchy may include an Active Directory structure for an enterprise, the first object may include a user group, and receiving the membership update may include receiving an Update Sequence Number (USN) change list that indicates direct relationship changes within the Active Directory structure. In such embodiments, receiving the membership update may include querying an Active Directory service membership enumeration Application Programming Interface (API) for changes to direct relationships within the Active Directory structure, and the membership update may indicate only changes to direct relationships within the Active Directory structure.

According to various embodiments, the third object comprises a user profile. In some embodiments, the method may further include creating the historical record such that the historical record indicates the second and third objects were directly related before the first point in time and the first and third objects were indirectly related before the first point in time. In such embodiments, the method may further include receiving an electronic discovery request to provide current and historical group membership information for objects within the Active Directory structure. The method may also include, in response to the electronic discovery request, performing the providing of the view of object relationships within the membership hierarchy as they exist at the first point in time by providing the record of group memberships instead of recursively traversing the Active Directory structure to identify group membership information and by providing the historical record.

According to certain embodiments, providing the view of object relationships within the membership hierarchy as they exist at the first point in time may include updating the record of group memberships to reflect the change in the indirect relationship between the first and third objects.

In various embodiments, the method may include receiving a request to provide membership information for the membership hierarchy. The method may also include, in response to the request to provide membership information for the membership hierarchy, performing the deducing of the change in the indirect relationship between the first and third objects and performing the providing of the view of object relationships within the membership hierarchy as they exist at the first point in time.

According to some embodiments, maintaining the record of group memberships for the membership hierarchy may include performing a full synchronization of the membership hierarchy at a point in time prior to the first point in time by identifying and recording direct relationships for all objects within the membership hierarchy. In such embodiments, updating the record of group memberships to reflect the change in the relationship between the second object and the third object may include an incremental synchronization of the membership hierarchy that updates the record of group memberships to reflect all changes to the membership hierarchy identified at the first point in time.

In one embodiment, a system for implementing the above-described method may include a group membership module programmed to maintain a record of group memberships for a membership hierarchy, the membership record identifying a direct relationship between a first object and a second object in the membership hierarchy. The system may also include an update module programmed to receive a membership update indicating that, as of a first point in time, a direct relationship between the second object and a third object changed and update the record of group memberships to reflect the change in the relationship between the second object and the third object. The system may further include a deduction module programmed to deduce, based on the membership update and the record of group memberships, a change in an indirect relationship between the first object and the third object as of the first point in time. The system may include at least one processor programmed to execute the group membership module, the update module, and the deduction module.

In some embodiments, the group membership module may be further programmed to use the record of group memberships, the updated change in the direct relationship between the second and third objects, and the deduced change in the indirect relationship between the first and third objects to provide a view of object relationships within the membership hierarchy as they exist at the first point in time. The group membership module may also be programmed to maintain a historical record of group memberships as they existed before the first point in time.

In some examples, the above-described method may be encoded as computer-readable instructions on a non-transitory computer-readable-storage medium. For example, a non-transitory computer-readable medium may include one or more computer-executable instructions that, when executed by at least one processor of a computing device, may cause the computing device to 1) maintain a record of group memberships for a membership hierarchy, the membership record identifying a direct relationship between a first object and a second object in the membership hierarchy, 2) receive a membership update indicating that, as of a first point in time, a direct relationship between the second object and a third object changed, 3) update the record of group memberships to reflect the change in the relationship between the second object and the third object, 4) deduce, based on the membership update and the record of group memberships, a change in an indirect relationship between the first object and the third object as of the first point in time, 5) use the record of group memberships, the updated change in the direct relationship between the second and third objects, and the deduced change in the indirect relationship between the first and third objects to provide a view of object relationships within the membership hierarchy as they exist at the first point in time, and 6) maintain a historical record of group memberships as they existed before the first point in time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
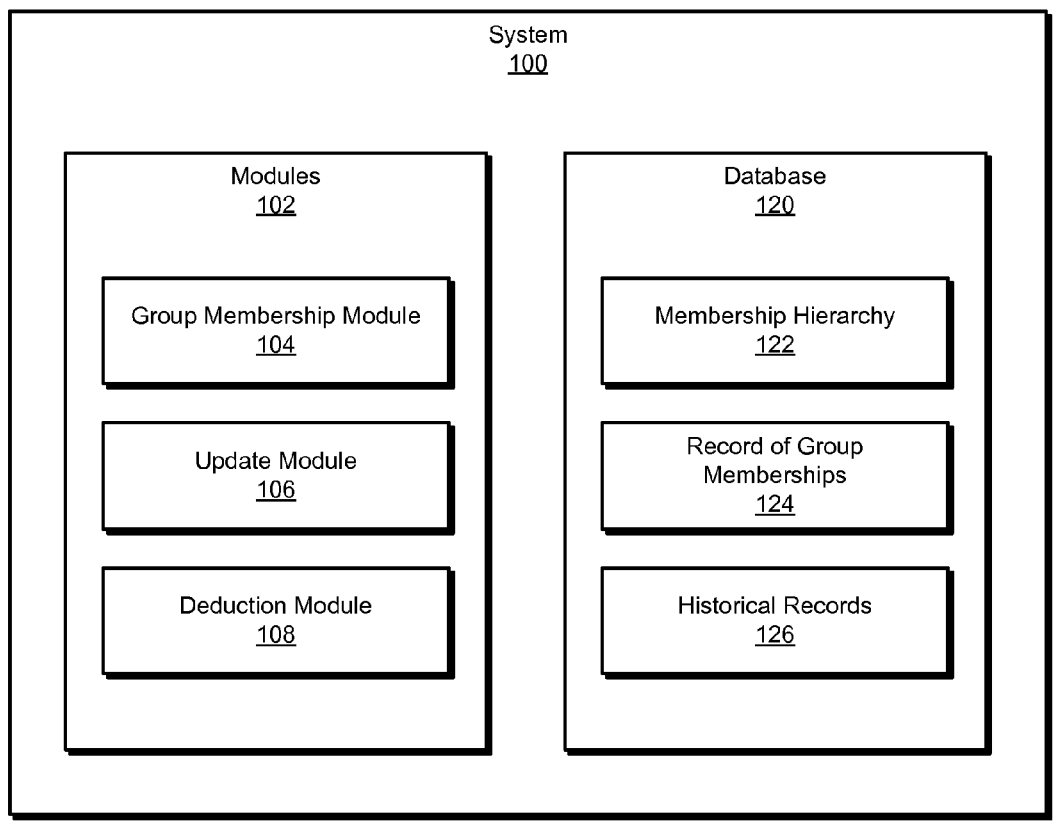
FIG. 1 is a block diagram of an exemplary system for maintaining group membership records.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure may maintain direct, indirect, and/or historical group membership records in a manner which reduces the time and/or resources required to identify and track group membership information. For example, embodiments of the instant disclosure may retrieve one or more direct relationship changes in a membership hierarchy and may use the direct relationship changes to deduce indirect membership changes and to create historical records. Some embodiments may use direct relationship changes to determine indirect relationship changes in a single pass instead of propagating and incrementally calculating changes.

Embodiments of the instant disclosure may improve the effectiveness and speed of acquiring information about membership hierarchies. For example, systems and methods disclosed herein may provide current and historical group membership records in response to an electronic discovery request in a much more efficient and effective manner than prior solutions. For example, algorithms disclosed herein may robust and reliable and may not add inconsistent membership records even when rerun. Embodiments of the instant disclosure may also provide various other features and advantages.

Figure 2:
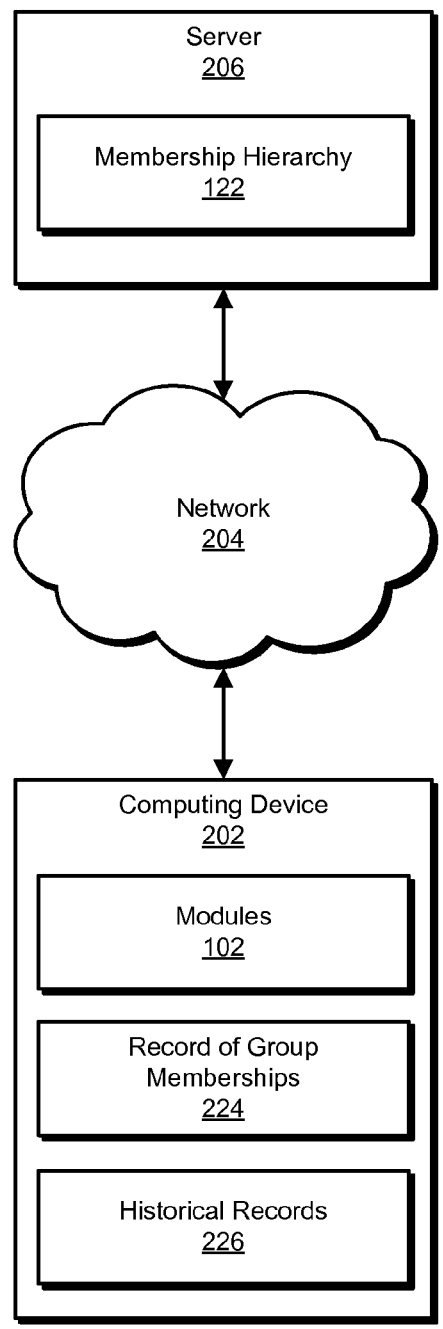
FIG. 2 is a block diagram of another exemplary system for maintaining group membership records.
Figure 4A:
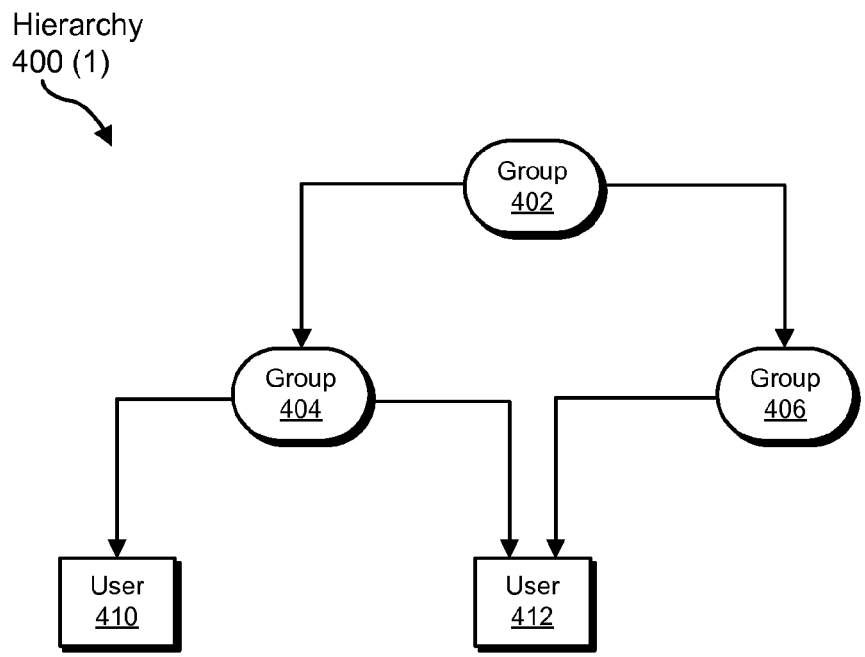
FIGS. 4A and 4B are block diagrams of an exemplary group membership hierarchy.
Figure 4B:
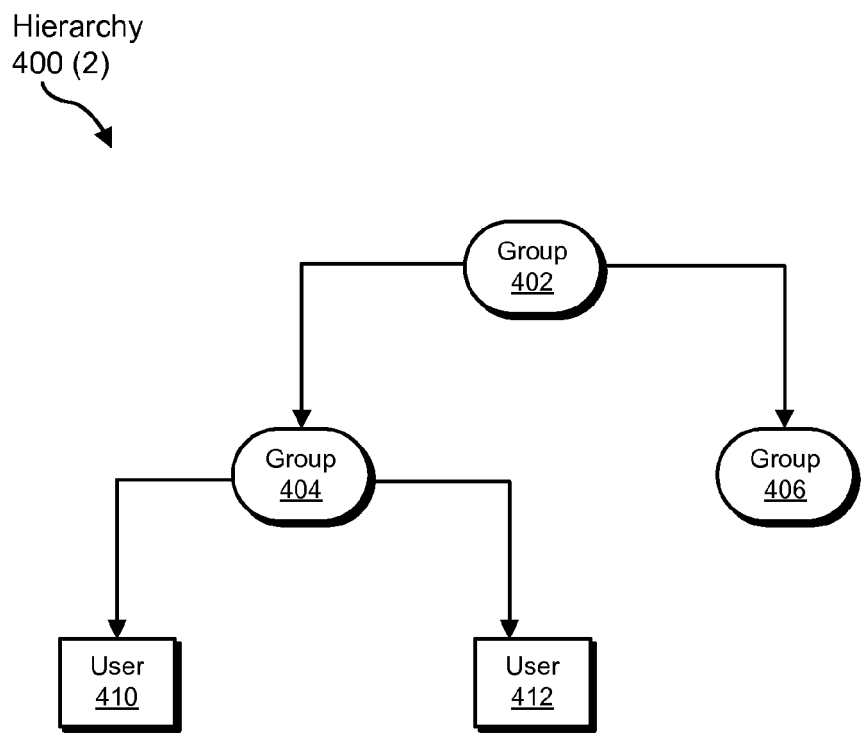
Figure 5A:
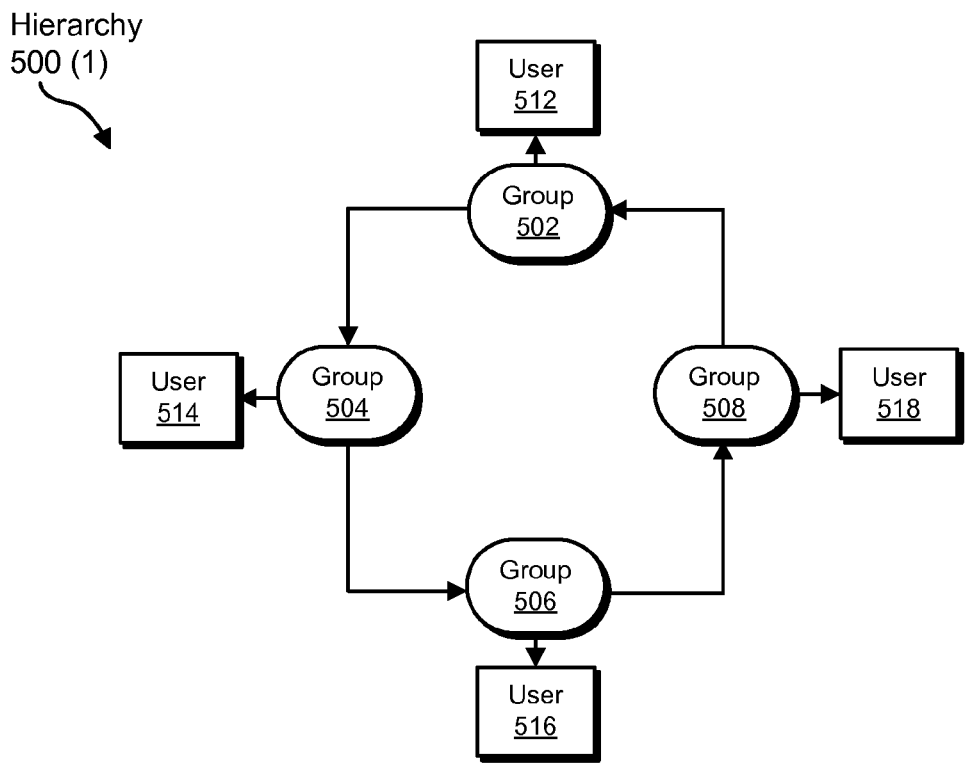
FIGS. 5A and 5B are block diagrams of another exemplary group membership hierarchy.
Figure 5B:
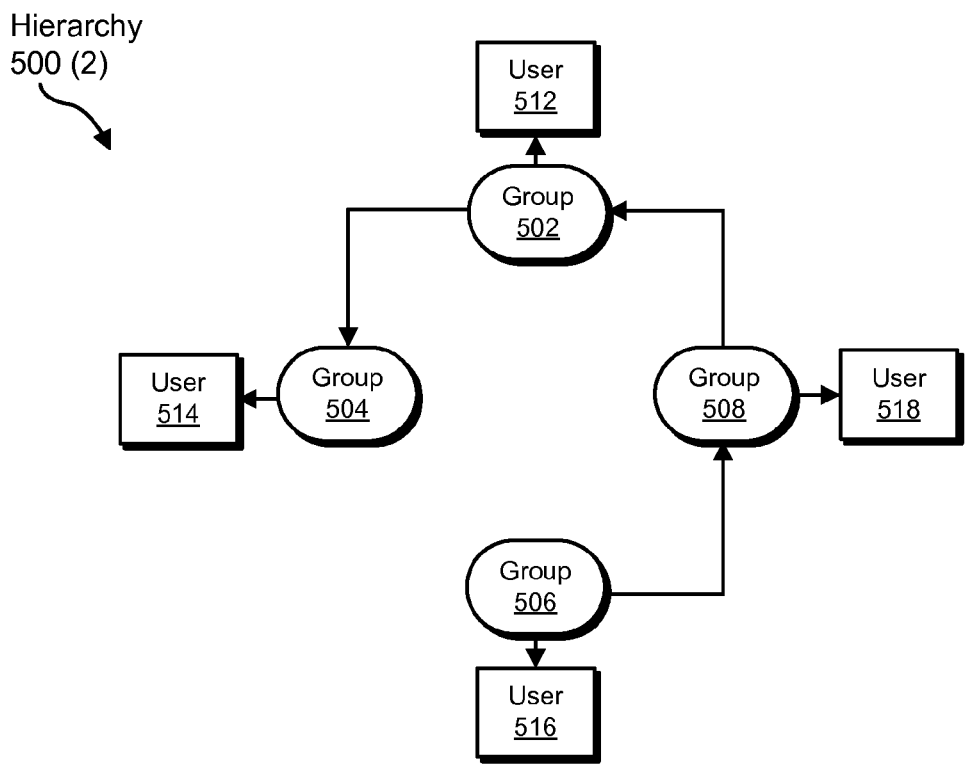

The following will provide, with reference to FIGS. 1-2, detailed descriptions of exemplary systems for maintaining group membership records. Detailed descriptions of corresponding computer-implemented methods will also be provided in connection with FIG. 3. FIGS. 4A and 4B will provide a description of an exemplary group membership hierarchy. FIGS. 5A and 5B will provide a description of another exemplary group membership hierarchy. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for maintaining group membership records. As illustrated in this figure, exemplary system 100 may include one or more modules 102 for performing one or more tasks. For example, and as will be explained in greater detail below, exemplary system 100 may include a group membership module 104 programmed to maintain a record of group memberships for a membership hierarchy. Exemplary system 100 may also include an update module 106 programmed to receive a membership update indicating that a relationship between a second object and a third object changed and update the record of group memberships to reflect the change in the relationship between the second object and the third object.

In addition, and as will be described in greater detail below, exemplary system 100 may include a deduction module 108 programmed to deduce, based on the membership update and the record of group memberships, a change in an indirect relationship between a first object and the third object as of a first point in time.

Group membership module 104 may be further programmed to use the record of group memberships, the updated change in the relationship between the second and third objects, and the deduced relationship between the first and third objects to provide a view of object relationships within the membership hierarchy as they exist at the first point in time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a membership hierarchy 122, a record of group memberships 124, and/or historical records 126.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to maintaining group membership records. For example, and as will be described in greater detail below, one or more of modules 102 may cause computing device 202 to 1) maintain a record of group memberships for a membership hierarchy, the membership record identifying a direct relationship between a first object and a second object in the membership hierarchy, 2) receive a membership update indicating that, as of a first point in time, a direct relationship between the second object and a third object changed, 3) update the record of group memberships to reflect the change in the relationship between the second object and the third object, 4) deduce, based on the membership update and the record of group memberships, a change in an indirect relationship between the first object and the third object as of the first point in time, and 5) use the record of group memberships, the updated change in the direct relationship between the second and third objects, and the deduced change in the relationship between the first and third objects to provide a view of object relationships within the membership hierarchy as they exist at the first point in time.

FIG. 2 also shows that server 206 may store membership hierarchy 122. FIG. 2 also shows that computing device 202 may store record of group memberships 124 and historical records 126. In the configuration shown in FIG. 2, server 206 may be an enterprise server that includes an Active Directory or other membership hierarchy for an organization and computing device 202 may provide membership record tracking for the membership hierarchy. While FIG. 2 shows modules 102, record of group memberships 124, and historical records 126 as being remote from membership hierarchy 122, one or more of these elements may be provided locally with membership hierarchy 122 (e.g., on server 206) or in any other suitable location.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device.

Server 206 generally represents any type or form of computing device that is capable of providing a membership hierarchy. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
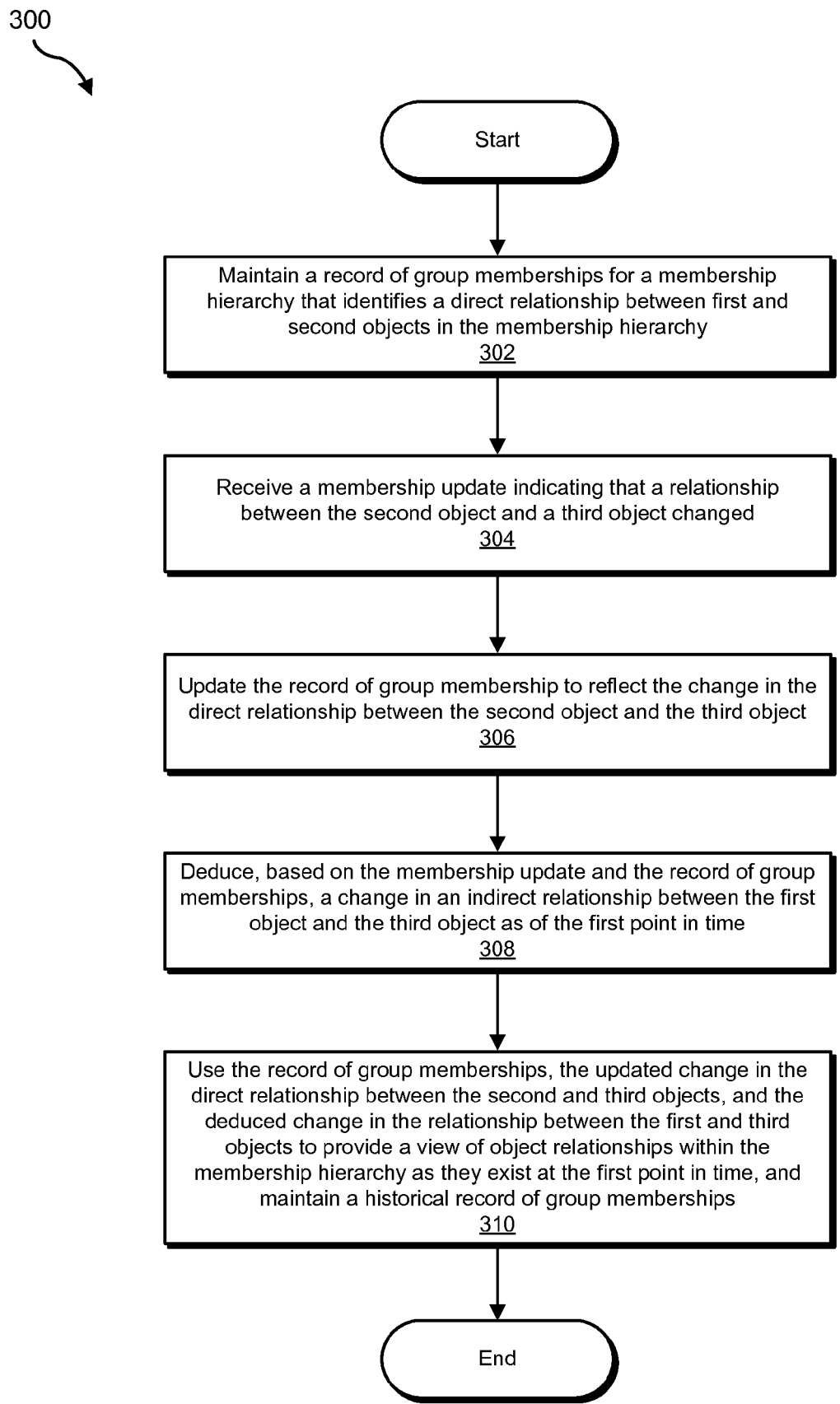
FIG. 3 is a flow diagram of an exemplary method for maintaining group membership records.

FIG. 3 is a flow diagram of an exemplary computer-implemented method 300 for maintaining group membership records. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302 in FIG. 3, one or more of the systems described herein may maintain a record of group memberships for a membership hierarchy, where the membership record identifies a direct relationship between a first object and a second object in the membership hierarchy. For example, group membership module 104 in FIG. 1 (which may, as detailed above, represent a portion of computing device 202 in FIG. 2) maintains a record of group memberships 124 for membership hierarchy 122. As discussed in greater detail below, group membership module 104 may maintain one or more of a variety of types of membership records.

Group membership module 104 may maintain a record of group memberships for a membership hierarchy in a variety of manners. For example, group membership module 104 may maintain a record of group memberships for membership hierarchy 122 by initially performing a full synchronization of membership hierarchy 122 and subsequently performing incremental synchronizations of membership hierarchy 122, as discussed in greater detail below. Group membership module 104 may perform a full synchronization of membership hierarchy 122 by identifying each object within membership hierarchy 122 and identifying each relationship between objects within membership hierarchy 122.

Group membership module 104 may identify various types of relationships between objects in a hierarchy. For example, group membership module 104 may identify direct relationships between two objects in a membership hierarchy. As used herein, the phrase "direct relationship" generally refers to any relationship between two objects in which the objects are directly associated with each other without any other intervening objects being part of the association. For example, a direct relationship between a first object and a second object may be a relationship in which the second object is a child of the first object. In some embodiments, a direct relationship between a first object and a second object may be a one-to-one relationship between the objects. Alternatively, a direct relationship between two objects may be part of a one-to-many relationship.

Group membership module 104 may also identify indirect relationships between objects in a membership hierarchy. As used herein, the phrase "indirect relationship" generally refers to any relationship between a first object and a second object in which the first object is associated with a second object through a third object. In other words, a first object may be indirectly related to a second object by virtue of both the first and second objects being directly related to a third object.

Indirect relationships disclosed herein may be any suitable degree of distance apart. For example, if two objects are indirectly related via a single intervening object, the indirect relationship may be referred to as second degree relationship or a second degree indirect relationship. As another example, an object related to another object via connections through two other objects may be referred to as a third degree indirect relationship. A direct relationship between two objects may be referred to as a first degree relationship.

As used herein, the phrase "membership hierarchy" generally refers to any hierarchy of groups and/or other objects. For example, a membership hierarchy may include a directory structure, such as an Active Directory structure provided by WINDOWS domain networks. Alternatively, a membership hierarchy may include a file system structure, such as a set of interrelated directories and objects within the directories.

Objects within a membership hierarchy may be any suitable type or form of object. For example, objects within an Active Directory structure may include user groups and/or user accounts. In a file system hierarchy, objects may include folders and/or files.

Using FIGS. 4A and 4B as examples, group membership module 104 may maintain a record of group memberships for hierarchy 400. FIG. 4A shows hierarchy 400 (1) before a change in a relationship within hierarchy 400 and hierarchy 400 (2) shows hierarchy 400 after a change. As shown in FIGS. 4A and 4B, hierarchy 400 may include a group 402, a group 404, and a group 406. Group 404 and group 406 may be children of group 402. FIGS. 4A and 4B also show user 410 as a child of group 404 and user 412 as a child of group 406 in FIG. 4A. Group membership module 104 may maintain one or more of a variety of types of lists, tables, and/or other records that show group memberships for hierarchy 400. For example, group membership module 104 may identify group to group memberships in hierarchy 400 and may create a group-to-group membership record as show in table 1 below.

TABLE 1

Group-to-Group Membership Record

| Group | Child Group |
|---|---|
| Group 402 | Group 406 |
| Group 402 | Group 404 |

Group membership module 104 may also identify direct group-to-user relationships within hierarchy 400 (1) and create a group-to-user membership record as shown in table 2 below.

TABLE 2

Group-to-User Membership Record

| Group | User | Direct |
|---|---|---|
| Group 406 | User 412 | True |
| Group 404 | User 410 | True |
| Group 404 | User 412 | True |

The information shown in tables 1 and 2 (e.g., the group-to-group and group-to-user records) may be used by group membership module 104 to prepare direct and indirect user-to-group membership information and to maintain a history of changes in membership in an optimized way, as discussed in greater detail below. For example, in a full synchronization of all objects in hierarchy 400 (1), group membership module 104 may compute direct and indirect group-to-group relationships for all groups in hierarchy 400 (1). In order to do so, group membership module 104 may insert all identified groups into a group-parent-child relationship record as a child of itself, as shown below in table 3. Group membership module 104 may then insert all other group relationships into the group-parent-child relationship record shown in table 3.

TABLE 3

Group-Parent-Child Relationship Record

| Group | Child Group |
|---|---|
| Group 402 | Group 402 |
| Group 402 | Group 406 |
| Group 402 | Group 404 |
| Group 404 | Group 404 |
| Group 406 | Group 406 |

Group membership module 104 may then create a group membership record for current group membership by indicating each relationship between a group and a user, as shown below in table 4. Table 4 may indicate that the relationship is a direct relationship by indicating "true" in the direct column and may indicate that the relationship is an indirect relationship by indicating "false" in the direct column as shown in table 4.

TABLE 4

Current Group Membership

| Group | User | Direct |
|---|---|---|
| Group 406 | User 412 | True |
| Group 404 | User 410 | True |
| Group 404 | User 412 | True |
| Group 402 | User 412 | False |
| Group 402 | User 410 | False |

FIGS. 5A and 5B show another example of how group membership module 104 may maintain one or more records of group memberships for a membership hierarchy. FIGS. 5A and 5B show a hierarchy 500 (1) and a hierarchy (2) that include a group 502, a group 504, a group 506, and a group 508. As shown in FIG. 5A, group 504 may be a child of group 502, group 506 may be a child of group 504, group 508 may be a child of group 506, and group 502 may be a child of group 508. FIG. 5A also shows a user 512 as a child of group 502, a user 514 as a child of group 504, a user 516 as a child of group 506, and a user 518 as a child of group 508.

Group membership module 104 may create a group-to-group membership record that identifies direct relationships between different groups, as shown in table 5 below.

TABLE 5

Group-to-Group Membership Record

| Group | Child Group |
| --- | --- |
| Group 502 | Group 504 |
| Group 504 | Group 506 |
| Group 506 | Group 508 |
| Group 508 | Group 502 |

Group membership module 104 may also create a group-to-user membership record that shows direct relationships between groups and users, as shown in table 6 below.

TABLE 6

Group-to-User Membership Record

| Group | User | Direct |
| --- | --- | --- |
| Group 502 | User 512 | True |
| Group 504 | User 514 | True |
| Group 506 | User 516 | True |
| Group 508 | User 518 | True |

Using the group-to-group membership record and the group-to-user membership record, group membership module 104 may compute a group-to-parent-child relationship record that shows parent and child relationships for each group, including the group as a child of itself as shown in table 7.

TABLE 7

Group-Parent-Child Relationship Record

| Group | Child Group |
| --- | --- |
| Group 502 | Group 502 |
| Group 502 | Group 504 |
| Group 502 | Group 506 |
| Group 502 | Group 508 |
| Group 504 | Group 502 |
| Group 504 | Group 504 |
| Group 504 | Group 506 |
| Group 504 | Group 508 |
| Group 506 | Group 502 |
| Group 506 | Group 504 |
| Group 506 | Group 506 |
| Group 506 | Group 508 |
| Group 508 | Group 502 |
| Group 508 | Group 504 |
| Group 508 | Group 506 |
| Group 508 | Group 508 |

Group membership module 104 may also compute a current group membership that indicates direct and indirect relationships between groups and users, as shown in table 8 below.

TABLE 8

Current Group Membership

| Group | User | Direct |
| --- | --- | --- |
| Group 502 | User 512 | True |
| Group 502 | User 514 | False |
| Group 502 | User 516 | False |
| Group 502 | User 518 | False |
| Group 504 | User 512 | False |
| Group 504 | User 514 | True |
| Group 504 | User 516 | False |
| Group 504 | User 518 | False |
| Group 506 | User 512 | False |
| Group 506 | User 514 | False |
| Group 506 | User 516 | True |
| Group 506 | User 518 | False |
| Group 508 | User 512 | False |
| Group 508 | User 514 | False |
| Group 508 | User 516 | False |
| Group 508 | User 518 | True |

At step 304 in FIG. 3, one or more of the systems described herein may receive a membership update indicating that, as of a first point in time, a direct relationship between the second object and a third object has changed. For example, update module 106 in FIG. 1 (which may, as detailed above, represent a portion of computing device 202 in FIG. 2) may receive a membership update indicating that a direct relationship between a second object and a third object has changed.

Update module 106 may receive a membership update in one or more of a variety of manners and/or situations. For example, update module 106 may receive a membership update as part of an incremental synchronization of a membership hierarchy. In examples where the membership hierarchy is an Active Directory structure, update module 106 may receive a membership update by querying an Active Directory service membership enumeration Application Programming Interface (API) for changes to direct relationships within the Active Directory structure. In response, update module 106 may receive a membership update that indicates only changes to direct relationships within the Active Directory structure. Additionally or alternatively, update module 106 may also receive changes to one or more indirect relationships within the Active Directory structure. Update module 106 may also receive a membership update in any other suitable manner. For example, in embodiments where the membership hierarchy comprises an Active Directory structure for an enterprise, receiving the membership update may include receiving an update sequence number (USN) change list that indicates direct relationship changes within the Active Directory structure.

Turning to the example shown in FIGS. 4A and 4B, update module 106 may receive a membership update indicating that, as of a first point in time, user 412 is no longer a child of group 406. Similarly, in the example shown in FIGS. 5A and 5B, update module 106 may receive a membership update indicating that group 506 is no longer a child of group 504.

As step 306 in FIG. 3, one or more of the systems described herein may update the record of group memberships to reflect the change in the relationship between the second object and the third object. For example, update module 106 in FIG. 1 may update record of group memberships 124 to reflect the change in the relationship between the second object and the third object.

After receiving the update, update module 106 may update one or more of a variety of records to update group memberships to reflect the change in relationship between the second object and the third object. Using FIGS. 4A and 4B as examples, update module 106 may check the group-to-group membership record to determine whether any updates between groups need to be made. Update module 106 may determine that no updates need to be made to the group-to-group membership record, as shown in table 9.

TABLE 9

Group-to-Group Membership Record

| Group | Child Group |
|---|---|
| Group 402 | Group 406 |
| Group 402 | Group 404 |

In the example shown in FIGS. 5A and 5 B, update module 106 may determine that the group-to-group relationship records need to be updated to reflect that group 506 is no longer a child of group 504, as shown in table 10.

TABLE 10

Group-to-Group Relationship Record

| Group | Child Group |
|---|---|
| Group 502 | Group 504 |
| Group 506 | Group 508 |
| Group 508 | Group 502 |

As part of updating the record of group memberships, update module 106 may additionally or alternatively update records of users within a group. Update module 106 may also update a record of group memberships by updating any other type or form of membership record that indicates direct relationships between objects.

At step 308 in FIG. 3, one or more of the systems described herein may deduce, based on the membership update and the record of group memberships, a change in an indirect relationship between the first object and the third object as of the first point in time. For example, deduction module 108 in FIG. 1 (which may, as detailed above, represent a portion of computing device 202 in FIG. 2) may deduce, based on the membership update of the record of group memberships, a change in an indirect relationship between the first object and the third object as of the first point in time.

Deduction module 108 may deduce a change in an indirect relationship in any suitable manner. For example, deduction module 108 may infer a change in a relationship between two objects by identifying a change in an intermediate relationship between the first and third objects and inferring that that change affects the indirect relationship between the first and third objects.

In one example, the first object may be a grandparent of the third object and a parent of a second object, with the second object being a parent of third object. Thus, the first and third objects are indirectly related via the second object. In this example, deduction module 108 may deduce the indirect change between the first and third objects by identifying a change between the second and third objects and propagating the change to the relationship between the first and third objects (e.g., if the third object is removed from the hierarchy, the change indicating that the second object is no longer the parent of the third object may be propagated to indicate that the first object is no longer the grandparent of the third object).

Changes within a hierarchy may be propagated and deduced only for objects either directly or indirectly affected by the changes. Thus, embodiments of the present invention may be more efficient than prior solutions by only tracking changes to affected object relationships in incremental synchronizations. In other words, once a full synchronization for a hierarchy has been completed, any future synchronizations of the hierarchy may only need to identify and/or deduce direct and/or indirect relationships within the hierarchy that have changed.

In some embodiments, deduction module 108 may deduce a change in an indirect relationship by propagating changes in direct relationships from group-to-group membership records and/or group-to-user membership records into a current user membership record. In the examples shown in FIGS. 4A and 4B, deduction module 108 may create a current group membership record as shown in table 11 below. As shown in table 11, the relationship between group 406 and user 412 is updated, but no other relationships are affected by this change and therefore do not need to be updated.

TABLE 11

Current Group Membership

| Group | User | Direct |
|---|---|---|
| Group 406 | User 412 | False |
| Group 404 | User 410 | True |
| Group 404 | User 412 | True |
| Group 402 | User 412 | False |
| Group 402 | User 410 | False |

Deduction module 108 may deduce (or may not need to deduce) group-parent-child-relationship records, which remain unchanged in the example of FIGS. 4A and 4B, as shown in table 12.

TABLE 12

Group-Parent-Child Relationship Record

| Group | Child Group |
|---|---|
| Group 402 | Group 402 |
| Group 402 | Group 406 |
| Group 402 | Group 404 |
| Group 406 | Group 406 |

Then, deduction module 108 may the remove the record for the parent-child relationship between group 406 and user 412 from the current group membership record, as show in table 13.

TABLE 13

Current Group Membership

| Group | User | Direct |
|---|---|---|
| Group 404 | User 410 | True |
| Group 404 | User 412 | True |
| Group 402 | User 412 | False |
| Group 402 | User 410 | False |

Turning to the example shown in FIGS. 5A and 5B, deduction module 108 may deduce a change in an indirect relationship by propagating changes in direct relationships from group-to-group membership records and/or group-to-user membership records into a current user membership record. Since direct user membership did not change in FIG. 5B, the current relationship between group members and users may stay the same, as shown in table 14.

TABLE 14

Current Direct Group Membership

| Group | User | Direct |
|---|---|---|
| Group 502 | User 512 | True |
| Group 504 | User 514 | True |
| Group 506 | User 516 | True |
| Group 508 | User 518 | True |

Continuing with the example from FIGS. 5A and 5B, deduction module 108 may then deduce changes to the group-parent-child relationship record to reflect the relationship change between group 504 and group 506, as shown in table 15.

TABLE 15

Group-Parent-Child Relationship Record

| Group | Child Group |
|---|---|
| Group 502 | Group 502 |
| Group 502 | Group 504 |
| Group 504 | Group 504 |
| Group 506 | Group 502 |
| Group 506 | Group 504 |
| Group 506 | Group 506 |
| Group 506 | Group 508 |
| Group 508 | Group 502 |
| Group 508 | Group 504 |
| Group 508 | Group 508 |

Deduction module 108 may also propagate the relationship change between group 504 and group 506 to a current group membership record as shown in table 16.

TABLE 16

Current Group Membership

| Group | User |
|---|---|
| Group 506 | User 512 |
| Group 506 | User 514 |
| Group 506 | User 516 |
| Group 506 | User 518 |
| Group 508 | User 512 |
| Group 508 | User 514 |
| Group 508 | User 518 |
| Group 502 | User 512 |
| Group 502 | User 514 |
| Group 504 | User 514 |

To update membership records by propagating direct changes to indirect relationships, deduction module 108 may prepare an add list and/or a remove list. For example, in an Active Directory hierarchy, for each affected parent group (e.g., each parent group listed in a parent-group-child relationship record), an add list may include a list of direct users of all children of the parent group (including itself) less existing direct and indirect users for the parent group. A remove list may include, for each affected parent group (e.g., each parent group listed in a parent-group-child relationship record), a list of direct and indirect users of the parent group less direct users of all children of the parent group. As shown in the tables below, records from the remove list may be inserted into a historical record. Then, as reflected in the tables 14 and 16 above, records identified in the remove list may be deleted from an existing group-to-user membership table. Similarly, records from the add list may be added to existing group-to-user membership tables. While the examples shown above reflect relationships being removed from a membership hierarchy, the process described above also applies to adding relationships to a membership hierarchy (e.g., when new relationships, groups, and/or users are added to an Active Directory).

According to various embodiments, direct and/or indirect relationships for a membership hierarchy may be updated within membership records in a single shot. For example, deduction module 108 may update membership records for all updated relationships at the same time (i.e., without performing a recursive or iterative process to identify changes throughout a membership hierarchy). As another example, a change in a first degree relationship may affects one or more other second degree relationships, third degree relationships, nth degree relationships, etc. Deduction module 108 may propagate the change in the first degree relationship to one or more of the second degree relationships, third degree relationships, and/or nth degree relationships in a single pass by updating membership records for the second, third, and/or nth degree relationships. In other words, deduction module 108 may simultaneously update all indirect relationship changes (including second, third, and nth degree indirect changes in a chain of object relationships) caused by a direct relationship change without iterating through the membership hierarchy to identify the affected indirect relationships. Thus, if a change to a first degree relationship affects a second degree relationship, and a change in the second degree relationship affects a third degree relationship, the change to the third degree relationship may be deduced without first deducing the change in the second degree relationship (e.g., the changes in the second and third degree relationships may be deduced in a single pass).

At step 310 in FIG. 3, one or more of the systems described herein may use the record of group memberships, the updated change in the direct relationship between the second and third objects, and the deduced change in the relationship between the first and third objects to provide a view of object relationships within the membership hierarchy as they exist at the first point in time. Systems and methods described herein may also maintain a historical record of group memberships as the existed before the first point in time. For example, group membership module 104 may use record of group memberships 124, the updated change in the direct relationship between the second and third objects, and the deduced change in the relationship between the first and third objects to provide a view of object relationships within the membership hierarchy as they exist at the first point in time. Group membership module 104 may also maintain a historical record of group memberships.

Group membership module 104 may provide the view of object relationships within a membership hierarchy in a variety of manners. For example, group membership module 104 may update the record of group memberships to reflect the change in the indirect relationship between the first and third objects. As another example, group membership module 104 may provide the view of object relationships by outputting a current status of the membership hierarchy. Additionally or alternatively, group membership module 104 may provide the view of object relationships by creating a historical record that indicates the second and third objects were directly related before the first point in time and/or that the first and third objects were indirectly related before the first point in time.

Using the example shown in FIGS. 4A and 4B, group membership module 104 may create a historical membership record that indicates group 406 was related to user 412 before Feb. 14, 2012, as shown in Table 17.

TABLE 17

Historic Membership Record

| Group | User | Start Date | End Date |
|---|---|---|---|
| Group 406 | User 412 | NULL | Feb. 14 2012 |

Turning to the examples shown in FIGS. 5A and 5B, group membership module 104 may create a historic membership record that indicates user 512 was related to group 504, user 516 was related to group 504, user 518 was related to group 504, user 516 was related to group 502, user 518 was related to group 502, and user 516 was related to group 508 before Feb. 14, 2012, as shown in Table 18.

TABLE 18

Historic Membership Record

| Group | User | Start Date | End Date |
|---|---|---|---|
| Group 504 | User 512 | NULL | Feb. 14 2012 |
| Group 504 | User 516 | NULL | Feb. 14 2012 |
| Group 504 | User 518 | NULL | Feb. 14 2012 |
| Group 502 | User 516 | NULL | Feb. 14 2012 |
| Group 502 | User 518 | NULL | Feb. 14 2012 |
| Group 508 | User 516 | NULL | Feb. 14 2012 |

By keeping historical membership records for a membership hierarchy, group membership module 104 may provide a quickly- and easily-accessible view into historical relationships between objects. Thus, past relationships between objects may be discovered without performing tedious and resource-consuming historical analyses.

In some embodiments, the methods disclosed herein may be performed as part of a response to a request for providing electronic discovery. For example, one or more of the modules described herein may receive an electronic discovery request to provide current and/or historical group membership information for objects within an Active Directory structure. In response to such a request, group membership module 104 may provide a view of object relationships within the Active Directory structure as they existed at a first point in time by providing the record of group memberships instead of recursively traversing the Active Directory structure to identify group membership information. Group membership module 104 may also, in response to the electronic discovery request, provide one or more historical records of group membership to provide a view of object relationships at one or more previous points in time.

Figure 6:
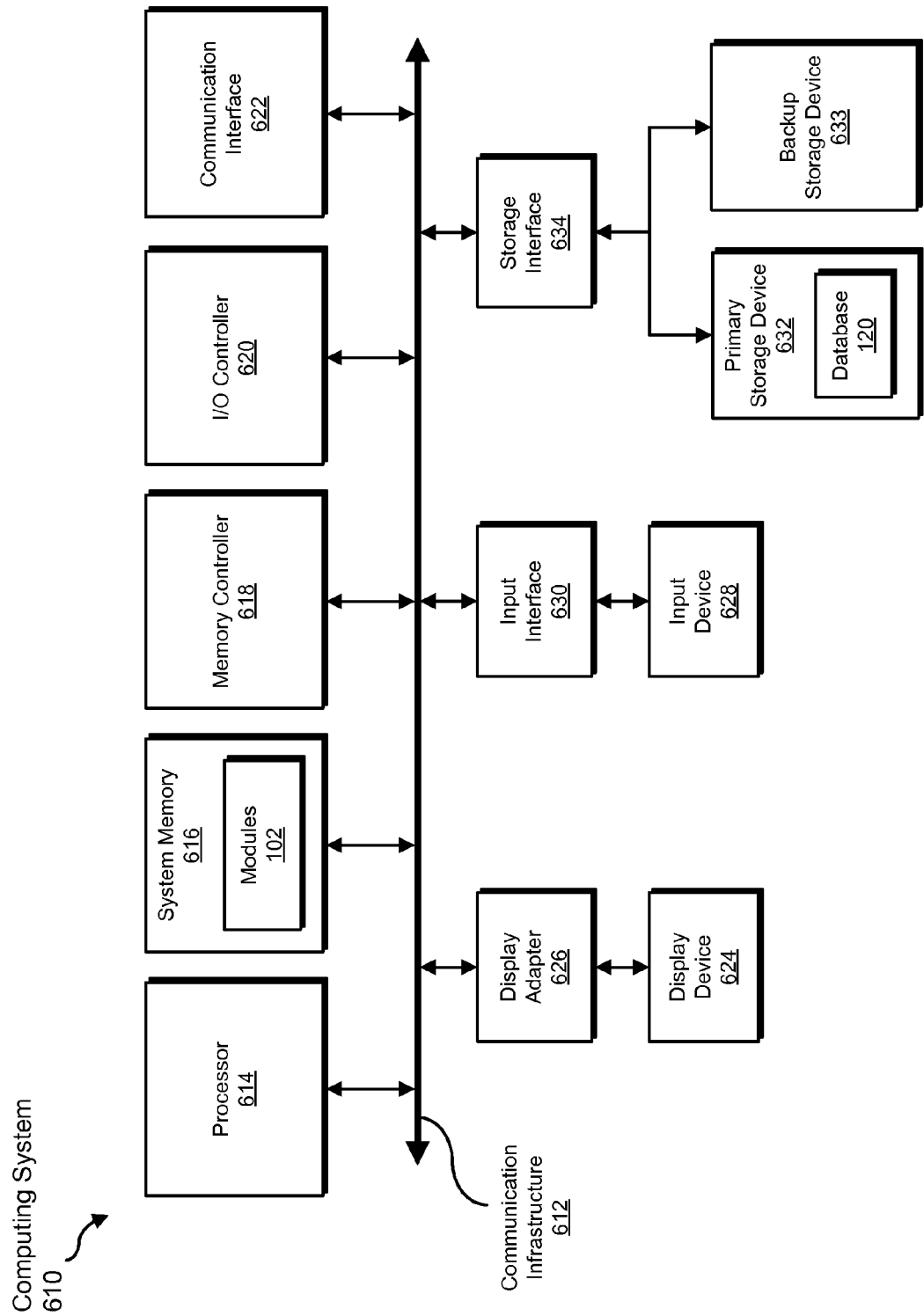
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the maintaining, identifying, receiving, updating, deducing, using, providing, and creating steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 610 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
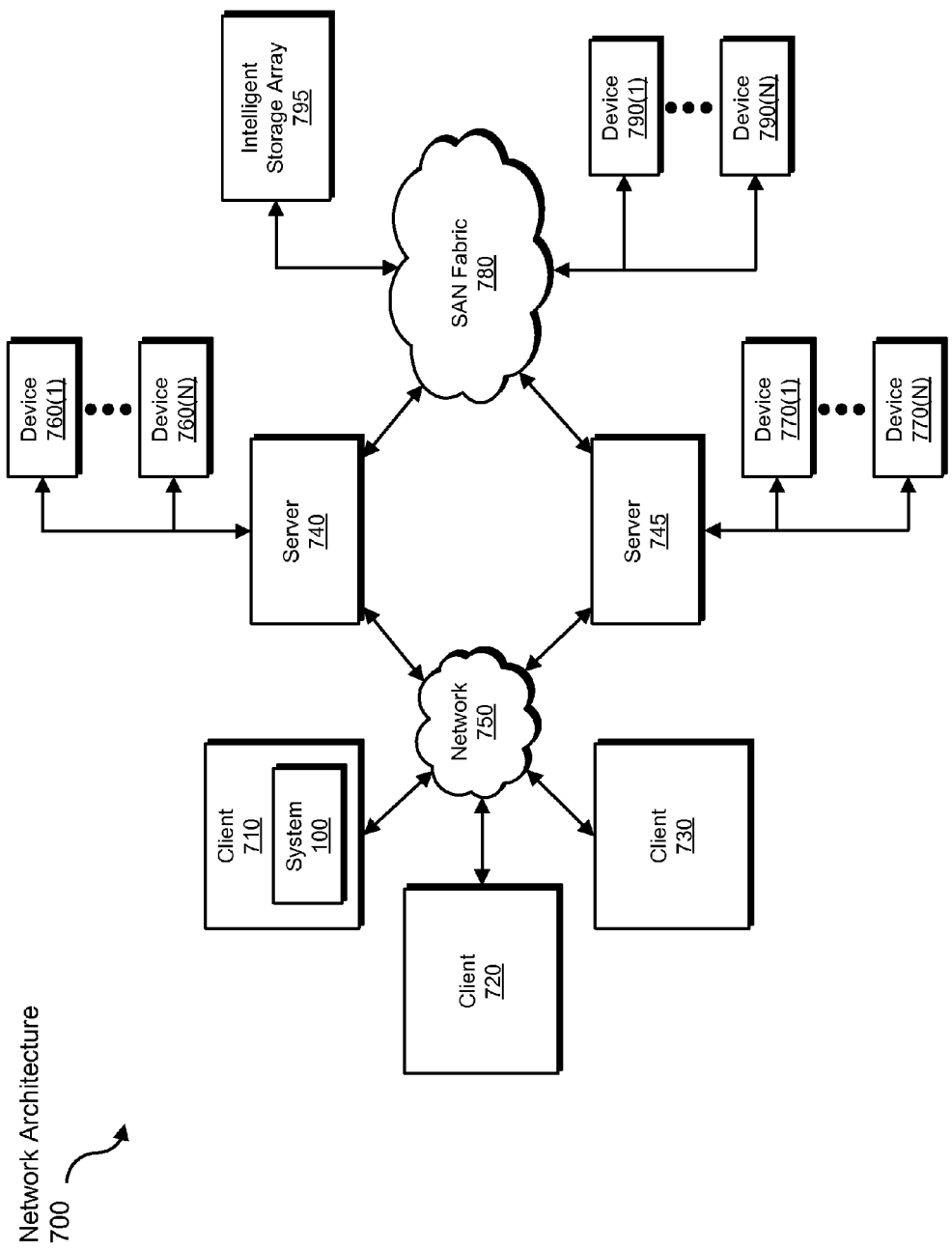
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the maintaining, identifying, receiving, updating, deducing, using, providing, and creating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for maintaining group membership records.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform database records by inferring indirect object relationships based on direct object relationships.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for maintaining group membership records, at least a portion of the method being performed by a computing device comprising at least one processor, the method comprising:

maintaining a record of group memberships for a membership hierarchy, the record of group memberships identifying:
  a first degree relationship between a first object and a second object in the membership hierarchy,
  a first degree relationship between the second object and a third object in the membership hierarchy, and
  a first degree relationship between the third object and a fourth object in the membership hierarchy;
receiving a membership update indicating that, as of a first point in time, the first degree relationship between the first object and the second object has changed;
deducing, based on the membership update, a change in a second degree relationship between the first object and the third object and a change in a third degree relationship between the first object and the fourth object as of the first point in time, wherein the changes in the second and third degree relationships are deduced in a single pass such that the change in the third degree relationship is deduced without first deducing the change in the second degree relationship.

2. The computer-implemented method of claim 1, wherein the change in the second degree relationship and the change in the third degree relationship are deduced simultaneously.

3. The computer-implemented method of claim 1, further comprising using the record of group memberships, the updated change in the first degree relationship, and the deduced change in the second and third degree relationships to provide a view of object relationships within the membership hierarchy as the object relationships exist at the first point in time.

4. The computer-implemented method of claim 1, further comprising maintaining a historical record of group memberships as they existed before the first point in time.

5. The computer-implemented method of claim 1, wherein:
  the membership hierarchy comprises an Active Directory structure for an enterprise;
  the first object comprises a user group;
  receiving the membership update comprises receiving an Update Sequence Number (USN) change list that indicates direct relationship changes within the Active Directory structure.

6. The computer-implemented method of claim 5, further comprising receiving an electronic discovery request to provide group membership information for objects within the Active Directory structure.

7. The computer-implemented method of claim 6, further comprising, in response to the electronic discovery request, providing a view of group membership information as it existed at the first point in time and by providing a historical record of group memberships as they existed before the first point in time.

8. A system for maintaining group membership records, the system comprising:
  a group membership module programmed to maintain a record of group memberships for a membership hierarchy, the record of group memberships identifying:
    a first degree relationship between a first object and a second object in the membership hierarchy,
    a first degree relationship between the second object and a third object in the membership hierarchy, and
    a first degree relationship between the third object and a fourth object in the membership hierarchy;
  an update module programmed to receive a membership update indicating that, as of a first point in time, the first degree relationship between the first object and the second object has changed;
  a deduction module programmed to deduce, based on the membership update, a change in a second degree relationship between the first object and the third object and a change in a third degree relationship between the first object and the fourth object as of the first point in time, wherein the deduction modules deduces the changes in the second and third degree relationships in a single pass such that the change in the third degree relationship is deduced without first deducing the change in the second degree relationship;
  at least one processor programmed to execute the group membership module, the update module, and the deduction module.

9. The system of claim 8, wherein the deduction module is further programmed to deduce simultaneously the change in the second degree relationship and the change in the third degree relationship.

10. The system of claim 8, wherein the group membership module is further programmed to use the record of group memberships, the updated change in the first degree relationship, and the deduced change in the second and third degree relationships to provide a view of object relationships within the membership hierarchy as the object relationships exist at the first point in time.

11. The system of claim 8, wherein the group membership module is further programmed to maintain a historical record of group memberships as they existed before the first point in time.

12. The system of claim 8, wherein:
  the membership hierarchy comprises an Active Directory structure for an enterprise;
  the first object comprises a user group;
  the update module is programmed to receive the membership update by receiving an Update Sequence Number (USN) change list that indicates direct relationship changes within the Active Directory structure.

13. The system of claim 12, wherein the group membership module is further programmed to receive an electronic discovery request to provide group membership information for objects within the Active Directory structure.

14. The system of claim 13, wherein the group membership module is further programmed to provide, in response to the electronic discovery request, a view of group membership information as it existed at the first point in time and by providing a historical record of group memberships as they existed before the first point in time.

15. A non-transitory computer-readable medium comprising one or more computer-executable instructions that, when executed by at least one processor of a computing device, cause the computing device to:
  maintain a record of group memberships for a membership hierarchy, the record of group memberships identifying:
    a first degree relationship between a first object and a second object in the membership hierarchy,
    a first degree relationship between the second object and a third object in the membership hierarchy, and
    a first degree relationship between the third object and a fourth object in the membership hierarchy;
  receive a membership update indicating that, as of a first point in time, the first degree relationship between the first object and the second object has changed;
  deduce, based on the membership update, a change in a second degree relationship between the first object and the third object and a change in a third degree relationship between the first object and the fourth object as of the first point in time, wherein the changes in the second and third degree relationships are deduced in a single pass such that the change in the third degree relationship is deduced without first deducing the change in the second degree relationship.

16. The non-transitory computer-readable medium of claim 15, wherein the change in the second degree relationship and the change in the third degree relationship are deduced simultaneously.

17. The non-transitory computer-readable medium of claim 15, wherein the one or more computer-executable instructions are further programmed to cause the computing device to:
use the record of group memberships, the updated change in the first degree relationship, and the deduced change in the second and third degree relationships to provide a view of object relationships within the membership hierarchy as the object relationships exist at the first point in time.

18. The non-transitory computer-readable medium of claim 15, wherein the one or more computer-executable instructions are further programmed to cause the computing device to:
maintain a historical record of group memberships as they existed before the first point in time.

19. The non-transitory computer-readable medium of claim 15, wherein:
the membership hierarchy comprises an Active Directory structure for an enterprise;
the first object comprises a user group;
receiving the membership update comprises receiving an Update Sequence Number (USN) change list that indicates direct relationship changes within the Active Directory structure.

20. The non-transitory computer-readable medium of claim 19, wherein the one or more computer-executable instructions are further programmed to cause the computing device to:
receive an electronic discovery request to provide group membership information for objects within the Active Directory structure.

* * * * *